United States Patent [19]

McEowen

[11] Patent Number: 4,767,181
[45] Date of Patent: Aug. 30, 1988

[54] ELECTRICAL/LIGHTWAVE CONNECTION ARRANGEMENT

[75] Inventor: James R. McEowen, Holmdel, N.J.

[73] Assignees: American Telephone and Telegraph Company, New York, N.Y.; AT&T Information Systems Inc., Morristown, N.J.

[21] Appl. No.: 31,174

[22] Filed: Mar. 26, 1987

Related U.S. Application Data

[63] Continuation of Ser. No. 552,610, Nov. 17, 1983, abandoned.

[51] Int. Cl.⁴ .............................................. G02B 6/36
[52] U.S. Cl. ............................. 350/96.21; 350/96.20; 350/96.16; 439/106; 439/107; 439/577; 439/606
[58] Field of Search ............... 350/96.10, 96.15, 96.16, 350/96.20, 96.21, 96.22, 96.23; 250/227; 439/100, 101, 102, 106, 107, 108, 180, 210, 378, 574, 575, 577, 604, 606, 816, 843, 845

[56] References Cited

U.S. PATENT DOCUMENTS

| | | | |
|---|---|---|---|
| 2,686,297 | 8/1954 | Hutt | 439/107 |
| 3,942,859 | 3/1976 | Korodi | 350/96.22 |
| 4,081,208 | 3/1978 | Meade | 350/96.20 |
| 4,111,509 | 9/1978 | Novak | 439/102 |
| 4,320,938 | 3/1982 | Gunnersen et al. | 350/96.21 |
| 4,390,237 | 6/1983 | Marazzi | 350/96.20 |
| 4,432,604 | 2/1984 | Schwab | 350/96.21 |
| 4,465,333 | 8/1984 | Caserta et al. | 350/96.20 |
| 4,545,077 | 10/1985 | Drapala et al. | 350/96.16 X |
| 4,678,264 | 7/1987 | Bowen et al. | 350/96.20 |
| 4,721,358 | 1/1988 | Faber et al. | 350/96.21 |

FOREIGN PATENT DOCUMENTS

| | | | |
|---|---|---|---|
| 2106662 | 4/1983 | United Kingdom | 350/96.21 |
| 2110409 | 6/1983 | United Kingdom | 350/96.20 |

OTHER PUBLICATIONS

Molex Inc. "Molex Full Line Catalog No. 870", (no date) pp. 32 E, 34 E and 47 E.
AMP Incorporated, Data Sheet 78-469, "AMP Optimate Multiple Position Fiber Optic Connectors", issued 2-79.
American National Standard ANSI/UL 498-1980, "Standard for Safety: Attachment Plugs and Receptacles", 10th ed., Feb. 16, 1983, pp. 40P, 41, 46-57, 65-74, 122, 127-129.
Telecom Highlights, Midland Park, N.J., pp. 20-1, 21, Jun. 22, 1983.

*Primary Examiner*—William L. Sikes
*Assistant Examiner*—Brian M. Healy
*Attorney, Agent, or Firm*—Ronald D. Slusky

[57] ABSTRACT

A combined electrical/lightwave connection arrangement provides electrical connections via conventional contact blades and ground post and a lightwave connection via a lightwave transmission line carried within the ground post.

15 Claims, 3 Drawing Sheets

ELECTRICAL/LIGHTWAVE CONNECTION ARRANGEMENT

This application is a continuation of application Ser. No. 522,610, filed on Nov. 17, 1983, now abandoned.

BACKGROUND OF THE INVENTION

The present invention relates to a combined electrical/lightwave connection arrangement.

Connections between electronic equipment and data communication channels are typically made by way of a data set, or modem. Although generally satisfactory from the functional standpoint, the modem has proved to be less than ideal in other respects. For example, a modem often brings with it a tangle of cables, connectors, transformers, interface boxes, etc. In addition, it may be quite bulky. As a result, there is often no satisfactory place to locate the modem where it is out of sight and out of the way.

Moreover, installing a new piece of data processing equipment, for example, or moving an old one to a new location, can be frustrating, time consuming and/or expensive. For example, the modem interface interconnections at a new location may be different from those at the old, and the required new connectors or adapters never seem to be on hand. In addition, moving the modem may require the services of a telephone company, or other vendor's, installer. Not only may there be a charge associated with this service, but also a delay until the work can be scheduled and performed.

In order to ameliorate the foregoing problems, as well as to provide enhanced data communication capabilities, such facilities as the local area network have evolved. Here, the equipment/data channel interface may be little more than a receptacle in the wall which places the terminal equipment in communication, via a (typically) passive communications path, with computers and other equipment within, say, a building or building complex.

A particularly advantageous way of implementing a local area network is with fiber optic, or lightwave, technology. A fiber optic cable is smaller than an electrical cable of comparable data capacity, and is not subject to electromagnetic interference, such as might originate from a building's electric power distribution system, and/or electrical equipment within it. At present, there is very little commercially available terminal equipment having a data input-output interface that is lightwave, rather than electrical. As such facilities as lightwave local area networks begin to proliferate, however, such terminal equipment will undoubtedly become commonplace.

In conjunction with this development, and as a step toward simplifying the installation and interconnection of optically-communicating terminal equipment, it will be advantageous to have a way of connecting such equipment to both the lightwave data communication path and the AC power system concurrently. In this way, the equipment—be it data processing equipment, alarms, or other "intelligent" equipment—will be ready to communicate immediately upon being "plugged in." At the same time, any such combined electrical/lightwave connection arrangement should be compatible with existing standard electrical connection arrangements so that (a) the same receptacles can be used to provide AC power to non-optically-communicating terminal equipment as well as to other electrical devices and (b) optically-communicating terminals can be plugged into standard non-optically-communicating receptacles when optical communications is not desired or available.

SUMMARY OF THE INVENTION

The present invention is directed to such a combined electrical/lightwave connection arrangement. In particular, as is conventional, the male, or plug, portion includes a pair of blades for carrying electrical current, and a ground post. In accordance with the invention, however, a lightwave transmission line—illustrating an optical fiber cable—is carried within the ground post and has a free end that terminates substantially at the free end of the ground post.

The female, or receptacle, portion of the connection arrangement includes conventional electrical contacts which are contacted when the plug is inserted in the receptacle. Further in accordance with the invention, the receptacle also includes a female lightwave connector body which carries a second lightwave transmission line. The latter is disposed within the receptacle such that, when the plug is inserted in the receptacle, the free end of the first lightwave transmission line is optically mated to a free end of the second lightwave transmission line.

DETAILED DESCRIPTION

Figure 1:
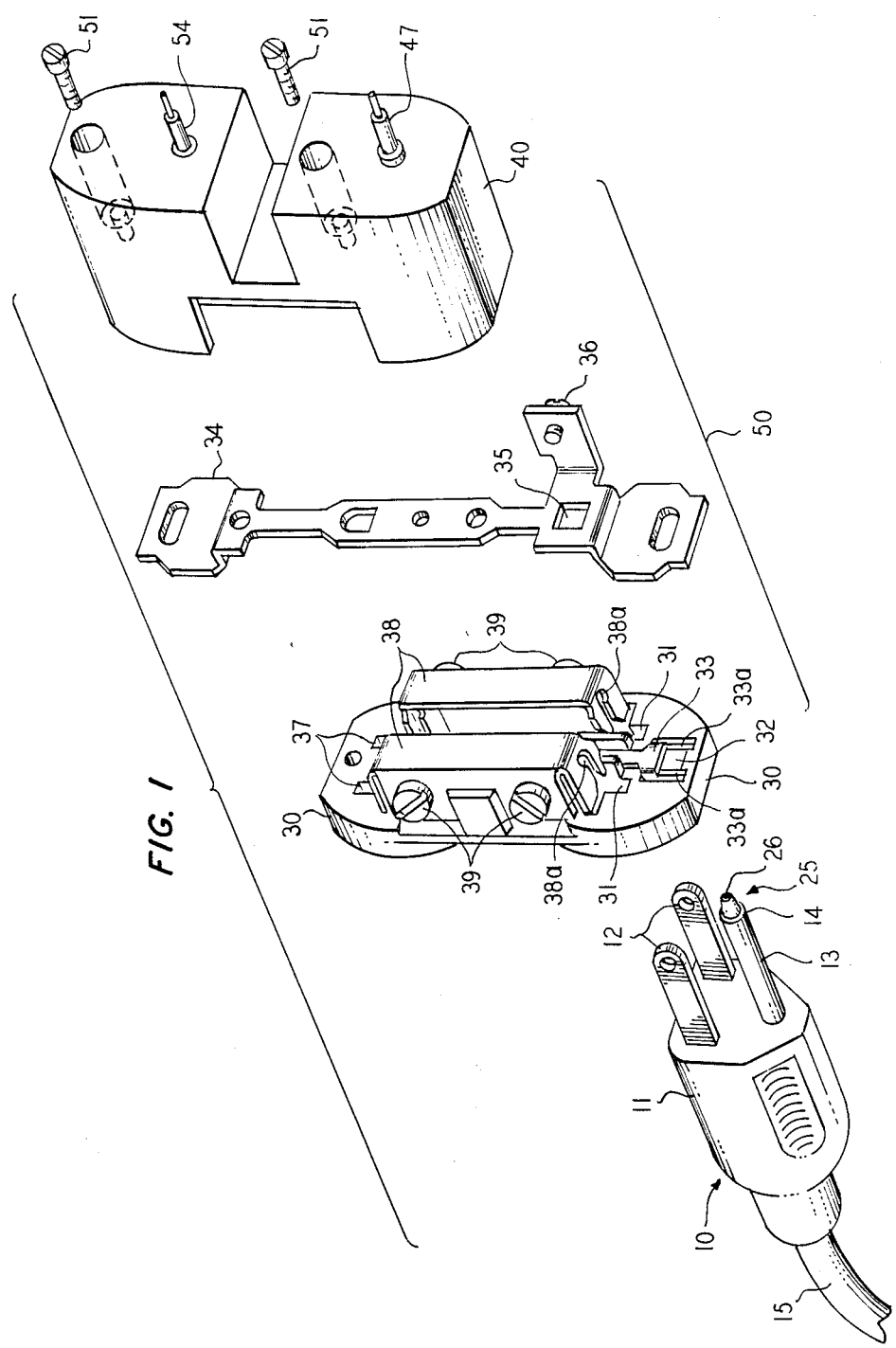
FIG. 1 is a partially exploded view of a plug and receptacle embodying the principles of the invention.
Figure 2:
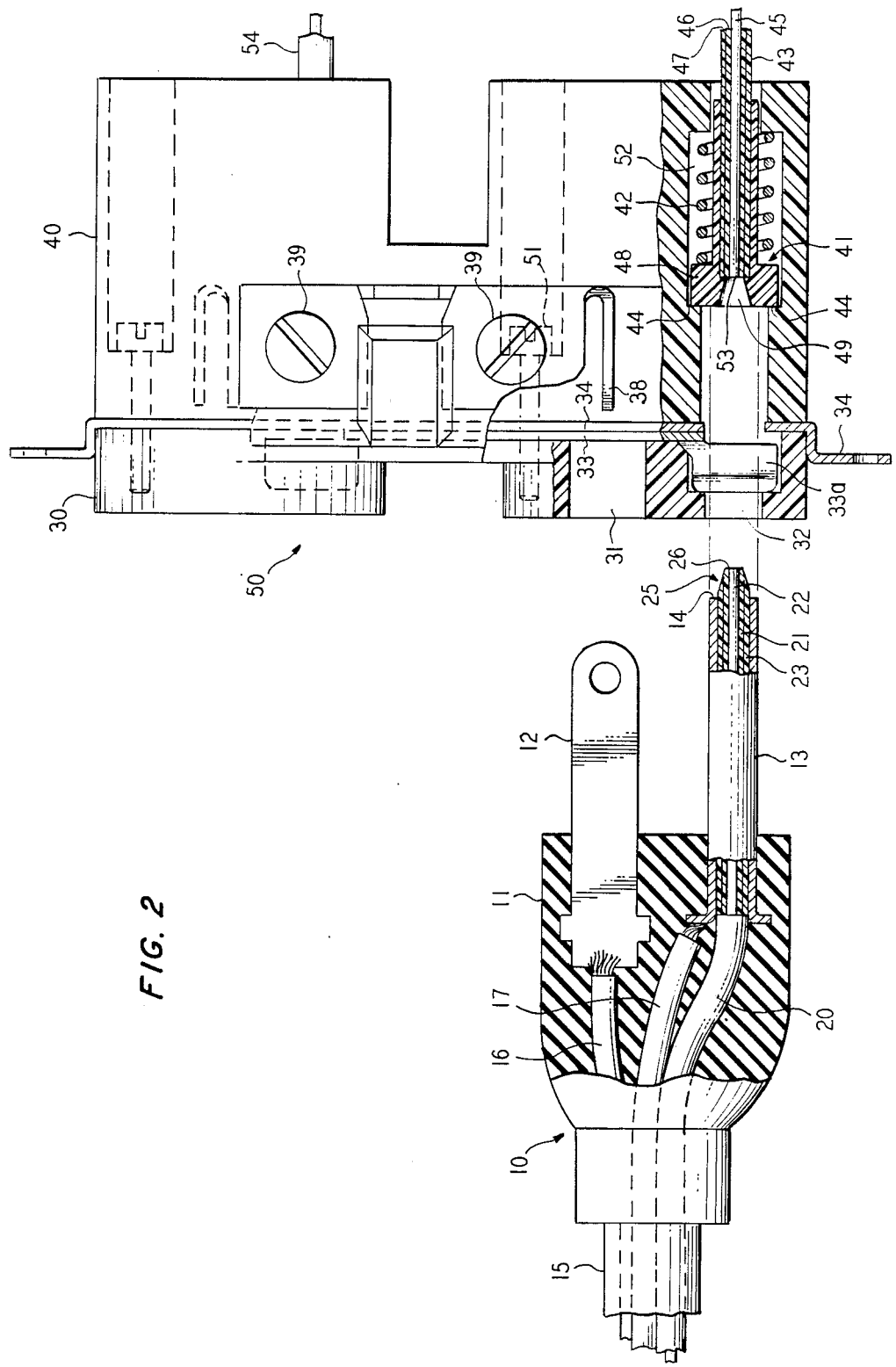
FIG. 2 is a partial cross-sectional view of the plug and receptacle disengaged.

In the present illustrative embodiment, as seen in FIGS. 1 and 2, the male portion, or plug, 10 of the electrical/lightwave connection arrangement comprises a molded housing 11 attached to a cable 15. Carried within cable 15 are a pair of insulated copper wires 16 (only one of which is visible in the drawing) which are adapted to carry 117 VAC electricity. Each of these wires is connected within housing 11 to a respective one of two electrically conductive, metal blades 12, which extend in parallel relation from housing 11. As is conventional, the width of each of blades 12 is within the range 0.240–0.260 inches and the spacing between them is within the range 0.495–0.505 inches, on center. Also carried within cable 15 is an insulated copper ground wire 17, which is connected within housing 11 to an electrically conductive, metal ground post 13. The latter extends from housing 11 to a free end 14. The distance from ground post 13 to each of blades 12 is nominally within the range 0.525–0.536 inches.

The female portion, or receptacle, 50 of the connection arrangement comprises a front piece 30, a ground bar 34 and back piece 40, which are held together by a pair of screws 51. Formed in front piece 30 is a pair of slots 31 adapted to receive blades 12 and a D-shaped aperture adapted to receive ground post 13. Also formed in front piece 30 is a second pair of slots 37 and a second D-shaped aperture (not visible), which are adapted to receive the blades and ground post, respectively, of a second plug (not shown).

Figure 3:
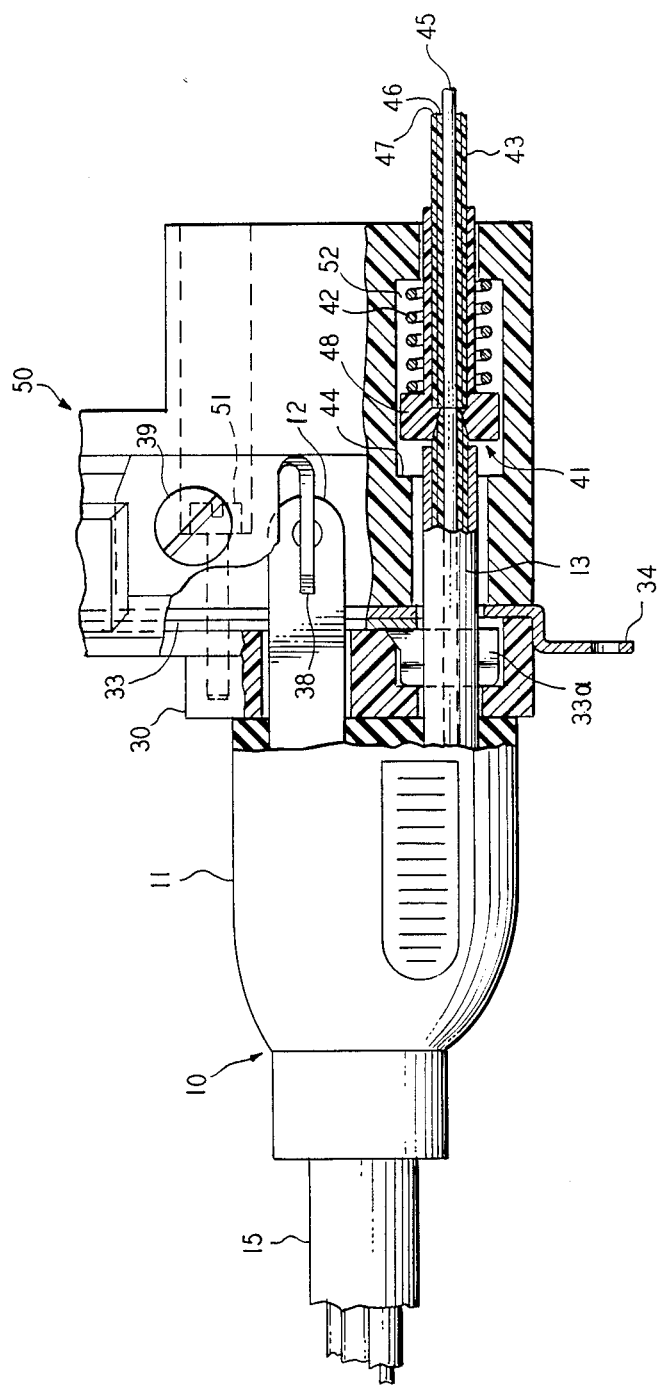
FIG. 3 is a partial cross-sectional view of the plug and receptacle engaged.

Disposed on the rear of front piece 30 are a pair of electrically conductive, metal contacts 38 to which the wires (not shown) supplying 117 VAC potential can be connected via screws 39. When, as shown in FIG. 3, plug 12 is inserted into receptacle 50, each one of blades 12 engages a slot 38a in a respective one of contacts 38, thereby supplying 117 VAC potential to wires 16 within cable 15.

In addition, connection of a ground wire (not shown) is made to ground bar 34 via screw 36. Ground bar 34, in turn is held in intimate contact with ground bus 33, the latter being disposed on the rear of front piece 30 between contacts 38. At each end of ground bus 33 is a set of fingers positioned on opposite sides of an associated one of the aforementioned D-shaped apertures. In particular, the fingers 33a of one of those sets are positioned on respective sides of aperture 32. When plug 10 is inserted in receptacle 50, ground post 13 contacts those fingers (and passes through hole 35 in ground bar 34). An electrical path for ground potential comprising screw 36, ground bar 34, ground bus 33 and ground post 13 is thus provided to ground wire 17 within cable 15.

In addition to wires 16 and 17, cable 15 also carries a first lightwave transmission line—illustratively an optical fiber cable—20, which is comprised of a optical fiber 22 surrounded by epoxy layer 21. The latter, in turn, is sheathed in a plastic jacket 23. In accordance with the invention, a terminal portion of cable 20 is disposed within, and is thus substantially surrounded by, ground post 13. In particular, ground post 13 is formed so as to define a channel extending from housing 11 to free end 14. In this embodiment, more particularly, post 13 is formed in the shape of a tubular pin, i.e., a hollow right circular cylinder, having an outside dimension within the range 0.184–0.190 inches. The free end, or tip, 25 of cable 20 is substantially coextensive with free end 14 of post 13. Specifically, jacket 23 terminates right at free end 14, while the optical fiber and surrounding epoxy extend out a little beyond it. Tip 25 is machined into a frustum shape terminating in a precision machined mating surface 26 adapted to couple light signals into and out of cable 20, the latter signals, in particular, being coupled out of the cable in a direction substantially parallel to post 13.

Further in accordance with the invention, receptacle 50 includes within back piece 40 a female lightwave connector body 41, the latter being slidably disposed within a chamber 52 and urged toward aperture 32 by a spring 42. Lightwave connector body 41 carries a second lightwave transmission line—illustratively an optical fiber cable 43—which is comprised of an optical fiber 45 surrounded by epoxy layer 46. The latter, in turn, is sheathed in a plastic jacket 47. Formed in the head 48 of lightwave connector body 41 is a frustum-shaped passage 49 adapted to mate with tip 25 of lightwave cable 20. Cable 43 has a free end terminating in a precision machined mating surface 53 adapted to couple lightwave signals into and out of cable 43. Passage 49 is open to, and terminates at, mating surface 53.

When plug 10 is not inserted in receptacle 50, spring 42 urges lightwave connector body 41 against stops 44 formed within rear piece 40. As plug 10 is inserted into receptacle 50, and even before it is fully inserted, tip 25 mates into passage 49. Since passage 49 terminates at mating surface 53, the latter is thereby brought into intimate contact with mating surface 26. A path for light signals is thus completed between optical fibers 22 and 45. As insertion of plug 10 continues, tip 25 pushes lightwave receptacle 41 to the right. Spring 42 applies a force on lightwave receptacle 4 which tends to keep the latter pushed to the left, thereby maintaining intimate contact between surfaces 26 and 53, and ensuring a good lightwave connection, when the plug is fully inserted, as shown in FIG. 3.

Although not explicitly shown or discussed herein, it will be appreciated that rear portion 40 illustratively includes a second female lightwave connector body which is substantially identical to female lightwave connector body 41 and which has an associated optical fiber cable 54. That second lightwave connector body is positioned within rear piece 40 so as to receive the tip of the ground post of a plug similar to plug 10 when the plug is inserted into the upper portion of receptacle 50.

The lightwave coupling arrangement shown and described herein is a relatively simple one and, with such an arrangement, there may be some small, e.g., several db, coupling loss due, for example, to fiber misalignment and/or fiber end separation. It is anticipated, however, that where the data rates over fibers 22 and 45 are relatively low, e.g., up to $10^6$ bits/sec, and/or the distances that the lightwave signals must travel before being repeatered or otherwise terminated are relatively short, e.g., tens or hundred of feet, such losses will not be of particular consequence. For more critical applications, where such losses may be significant, it may be desired to employ a more complex arrangement for mating and/or locking the optical fibers together.

It will thus be appreciated that the foregoing merely illustrates the principles of the invention and numerous variations are possible. Thus, by way of example but not limitation, the mating portions of tip 25 and lightwave connector body 41 may take on various alternative shapes; the male and female frustums may be reversed to provide greater protection to the end of the fiber disposed in the plug; fiber 20 could be terminated with a separate male lightwave connector body rather than simply a machined tip; the mating end of post 13 could be so formed and/or shaped as to play a greater role in assuring the alignment of fibers 22 and 45 and in such, as well as other, embodiments, the terminating face of fiber 22 might be flush with end of post 13; the structure of lightwave connector body 41 and/or the way it is disposed within rear piece 40 may be different than that illustratively shown herein; and post 13 and lightwave connector body 41 may each be arranged to carry more than one optical fiber cable and/or to carry optical fiber cables having more than one optical fiber therein.

Additionally, post 13 may be a cylinder having a cross-section that is other than circular or in fact may have an open, rather than closed cross-section. For example, post 13 may comprise a U-shaped blade rather than a tubular pin, with the lightwave transmission line being disposed within the channel defined by the "U" shape of the blade.

More generally, it is contemplated that the invention can be used in conjunction with various alternative electrical connection arrangements having, for example, various different numbers of blades and various different blade and ground post sizes, shapes and orientations adapted for various voltage and current ratings. Such alternative arrangements may include, but are not limited to, those disclosed in the American Qational Standard ANSI/UL 498—1980 entitled "Standard for Attachment Plugs and Receptacles," 10th ed., Feb. 16, 1983, hereby incorporated by reference, which standard is available from Underwriters Laboratories, Inc., Northbrook, Illinois.

Moreover, if an electrical grounding function is not needed, the electrical connections to post 13, i.e., wire 17, and to ground bar 34 may be omitted and post 13 need not be electrically conductive.

It will thus be appreciated that those skilled in the art will be able to devise various arrangements which, although not explicitly shown or described herein, embody the principles of the invention.

What is claimed is:

1. A connector arrangement comprising
   a plug housing,
   exactly two substantially parallel, electrically conductive blades extending from said housing, said blades each having a width substantially within a range of 0.240–0.260 inches and being spaced apart from one another by a distance substantially within a range of 0.495–0.505 inches, on center,
   first and second electrical wires connected to respective ones of said blades,
   a lightwave transmission line having a terminating portion having an end which is adapted to couple light signals into and out of said transmission line, and
   exactly one post extending from said housing and substantially surrounding said terminating portion, said post being substantially parallel to said blades, spaced apart from each of said blades by a distance substantially within a range of 0.525–0.536 inches, on center, and having an outside diameter substantially within a range of 0.184–0.190 inches.

2. The connector arrangement of claim 1 wherein said post is a hollow cylinder and said terminating portion is disposed within said hollow cylinder.

3. The connector arrangement of claim 2 wherein said post is electrically conductive and wherein said arrangement further comprises a third electrical wire connected to said post.

4. The connector arrangement of claim 1 wherein said post extends from said housing to a free end and wherein said end of said terminating portion is substantially coextensive with said free end of said post.

5. The connector arrangement of claim 4 wherein said post is electrically conductive and wherein said arrangement further comprises a third electrical wire connected to said post.

6. The connector arrangement of claim 1 wherein said end of said terminating portion is adapted to couple light signals out of said transmission line in a direction that is substantially parallel to said post.

7. The connector arrangement of claim 1 wherein said end of said terminating portion terminates in a mating surface which extends beyond said free end of said post.

8. The connector arrangement of claim 7 wherein said terminating portion is a frustum one face of which is said mating surface.

9. The connector arrangement of claim 8 wherein light signals are coupled out of said mating surface in a direction that is substantially parallel to said post.

10. A female connector arrangement for use in conjunction with a male connector arrangement, said male connector arrangement comprising a plug housing, a pair of substantially parallel, electrically conductive blades extending from said housing, said blades each having a width substantially within a range of 0.240–0.260 inches and being spaced apart from one another by a distance substantially within a range of 0.495–0.505 inches, on center, first and second electrical wires connected to respective ones of said blades, a first lightwave transmission line having a terminating portion terminating in a free end, said free end being adapted to couple light signals into and out of said first transmission line, and a post extending from said housing and substantially surrounding said terminating portion said post being substantially parallel to said blades, spaced apart from each of said blades by a distance substantially within a range of 0.525–0.536 inches, on center, and having an outside diameter substantially within a range of 0.184–0.190 inches, said female connector arrangement comprising,
    a receptacle body in which are formed a pair of slots adapted to receive said blades and in which is further formed an aperture adapted to receive said post,
    first and second electrically conductive means disposed within said body for contacting said blades when they are inserted into said slots,
    a second lightwave transmission line terminating within said body at a free end, said second transmission line free end being adapted to couple light signals into and out of said second transmission line, and
    means disposed within said body for optically mating said free ends of said first and second transmission lines when said post is inserted into said aperture.

11. The connector arrangement of claim 10 wherein there is formed in said mating means a passage terminating in said free end of said second transmission line, said passage being adapted to receive said free end of said first transmission line.

12. The connector arrangement of claim 10 wherein said mating means comprises a lightwave connector body having a shape such that said free ends of said first and second transmission lines are optically mated when said post is partially inserted in said aperture, and
    means for resiliently urging said lightwave connector body toward said aperture, said lightwave connector body being slidably disposed within said receptacle body such that said free ends of said first and second transmission lines are maintained in intimate contact when said post is fully inserted in said aperture.

13. A connector arrangement comprising
    a electrical plug including a plug housing, said plug being a type of plug conforming to American National Standard ANSI/UL 498 which has a post extending from said housing to a free end, said post having a channel formed therein extending from said housing to said free end, and
    a lightwave transmission line extending through said channel and having a free end adapted to couple light signals into and out of said transmission line.

14. The connector arrangement of claim 13 wherein said post is electrically conductive and said arrangement further comprises a third electrical wire connected to said post.

15. A female connector arrangement for use in conjunction with a male connector arrangement, said male connector arrangement comprising a electrical plug including a plug housing, said plug being a type of plug conforming to American National Standard ANSI/UL 498 which has a post extending from said housing to a free end, said post having a channel formed therein extending from said housing to said free end, and a lightwave transmission line extending through said channel and having a free end adapted to couple light signals into and out of said transmission line, said female connector arrangement comprising a female receptacle including a receptacle housing, said receptacle being a type of receptacle conforming to American National Standard ANSI/UL 498 which has an aperture adapted to receive said post, a second lightwave transmission line terminating within said receptacle housing at a free end, said second transmission line free end being adapted to couple light signals into and out of said second transmission line, and means disposed within said receptacle housing for optically mating said free ends of said first and second transmission lines when said post is inserted into said aperture.

* * * * *